United States Patent

Maus et al.

[15] 3,698,828
[45] Oct. 17, 1972

[54] APPARATUS FOR CONTROLLING A BALANCING MACHINE

[72] Inventors: Otfrid Maus, Langen; Martin Müeller, Bickenbach; Robert Müeller, Darmstadt, all of Germany

[73] Assignee: Carl Schenck Maschinenfabrik GmbH, Postfach, Germany

[22] Filed: Oct. 26, 1970

[21] Appl. No.: 83,821

[30] Foreign Application Priority Data

Dec. 27, 1969 Germany..........P 19 65 090.9

[52] U.S. Cl....................................408/11, 307/231
[51] Int. Cl. ..............................................B23b 39/04
[58] Field of Search...........................408/10, 11, 12

[56] References Cited

UNITED STATES PATENTS 3,228,264  1/1966  Trimble......................408/11

Primary Examiner—Gerald A. Dost
Attorney—Wolfgang G. Fasse

[57] ABSTRACT

This invention relates to apparatus for controlling balancing machines and to stop the balancing operation as soon as a rotational body has been balanced by a controlled mass change either in the form of a mass removal or of a mass addition. Said control is accomplished by producing an electrical signal which is representative of the imbalance and another electrical signal which is proportional to the non-linear variation of the effect of said controlled mass change. The latter signal is produced by a two terminal parallel network including a potentiometer the tap of which is adjusted in response to the instantaneous mass change. The two terminal network is connected to means for evaluating, for example comparing, the two signals to produce a control signal which, for example through a relay, stops a tool performing said balancing operation.

18 Claims, 4 Drawing Figures

INVENTOR.
OTFRID MAUS
MARTIN MÜLLER
ROBERT MÜLLER
ATTORNEY

APPARATUS FOR CONTROLLING A BALANCING MACHINE

This invention relates to an apparatus for controlling a balancing machine, more specifically, for stopping the balancing operation when the desired balancing has been accomplished.

In order to assure a precise balancing it is necessary to control the balancing operation in a radial direction of a rotational body by evaluating, for example by comparing, a measured imbalance representing value and a balancing representing value whereby the non-linear variation of the balancing effect due to changes in the compensating mass which is being removed or added in said radial direction, is to be taken into account or rather the influence of such non-linearity is to be eliminated because this non-linearity necessarily results in an incorrect balancing.

Prior art balancing machines for automatically balancing a rotational body in a radial direction comprise elaborate means for eliminating said non-linear variation of the balancing effect. Thus, it is known to distort the characteristic curve of the radial imbalance in order to produce an approximation curve comprising linear portions. These linear portions are then used for controlling the balancing operation whereby only a rough approximation of the actual characteristic curve is achieved.

It is a drawback of the just mentioned prior art devices that the production of said approximation curve requires elaborate and expensive technical means for calculating and electrically realizing the approximation curve in order to achieve the desired accuracy in automatic balancing machines.

Another even more serious drawback of the above prior art approach is seen in the fact that such approximation curve is valid only for a given rotational body and for a given tool. If different tools are to be used or if different rotational bodies are to be balanced a new approximation curve must be calculated and electrically realized.

OBJECTS OF THE INVENTION

In view of the above it is the main object of the invention ro remove the outlined drawbacks.

Another object of the invention is to provide a balancing apparatus which is highly precise and yet can be realized by relatively simple and thus inexpensive means.

Yet another important object of the invention is to control the balancing operation in response to the non-linear variation of the balancing effect of a compensating mass which is either removed as by a machining operation such as a radial drilling or which is added as by welding or soldering.

A still further object of the invention is to provide a balancing machine control apparatus which does not require any calculation of approximation curves.

Another object of the invention is to provide a balancing machine control apparatus which is independent of the type of tool employed so that the present apparatus is useful in connection with any type of balancing tool including the use of a laser beam.

A further object of the invention is to provide a balancing machine control apparatus which is independent of the type of the rotational body to be balanced.

A very important further object of the invention is to assure a balancing or imbalance compensation which at any instant is proportional to the instantaneous effect of the imbalance and to stop the balancing operation at the precise moment when the desired balance has been established.

It is also an object of the invention to compensate the additional non-linearity which is due to the fact that the compensating tool, such as a drill bit, has a conical tip.

A still further object of the invention is to provide means for adapting the circuit to use in connection with rotational bodies having different diameters and/or to bodies the rotational axis of which takes up different positions.

SUMMARY OF THE INVENTION

It has been found that the effect of a mass which is being removed radially from, or radially added to a rotational body decreases in an non-linear manner from the periphery of said body toward its rotational axis. Such non-linear variation is compensated according to the invention by a surprisingly simple electrical circuit arrangement which produces at its output a first signal proportional to the non-linear effect of the compensating mass by means of a two terminal parallel circuit supplied by a constant current source and including a potentiometer the tap of which is adjusted in response to the instantaneous position of a tool. One branch of the parallel circuit comprises a resistance corresponding in value to the resistance of one portion of the potentiometer as determined by the tap position. The other branch of the parallel circuit comprises a series connection of a variable resistance corresponding to the resistance of said potentiometer plus the other portion of the potentiometer as determined by said instantaneous tap position. The entire length of the potentiometer corresponds to the length of tool advance from the periphery of the rotational body to its rotational axis. The control signal itself is produced by evaluating, for example by comparing, said first signal and a further signal corresponding to the measured imbalance to produce a threshold signal which operates switching means to stop the further operation of the tool.

According to the invention there is further provided means for controlling the constant current supplied to said two terminal parallel circuit in response to the diameter of the compensating tool, such as a drill bit, and/or in response to the density of the rotational body to be balanced. Such control or rather adjustment of the constant current may be accomplished, for example, by respectively calibrated, manually adjustable potentiometer means.

Another feature of the invention provides a further potentiometer and/or a further adjustable resistance in the second branch of said two terminal parallel circuit whereby the present apparatus is easily adaptable to the balancing of rotational bodies having different diameters and/or to the balancing of rotational bodies the axis of which is located in different positions relative to a given, positionally fixed support for said rotational axis.

BRIEF FIGURE DESCRIPTION

In order that the invention may be clearly understood it will now be described, by way of example, with reference to the accompanying drawings, wherein:

FIG. 2b shows a detail modification according to FIG. 2a; and

EMBODIMENTS

Figure 1:
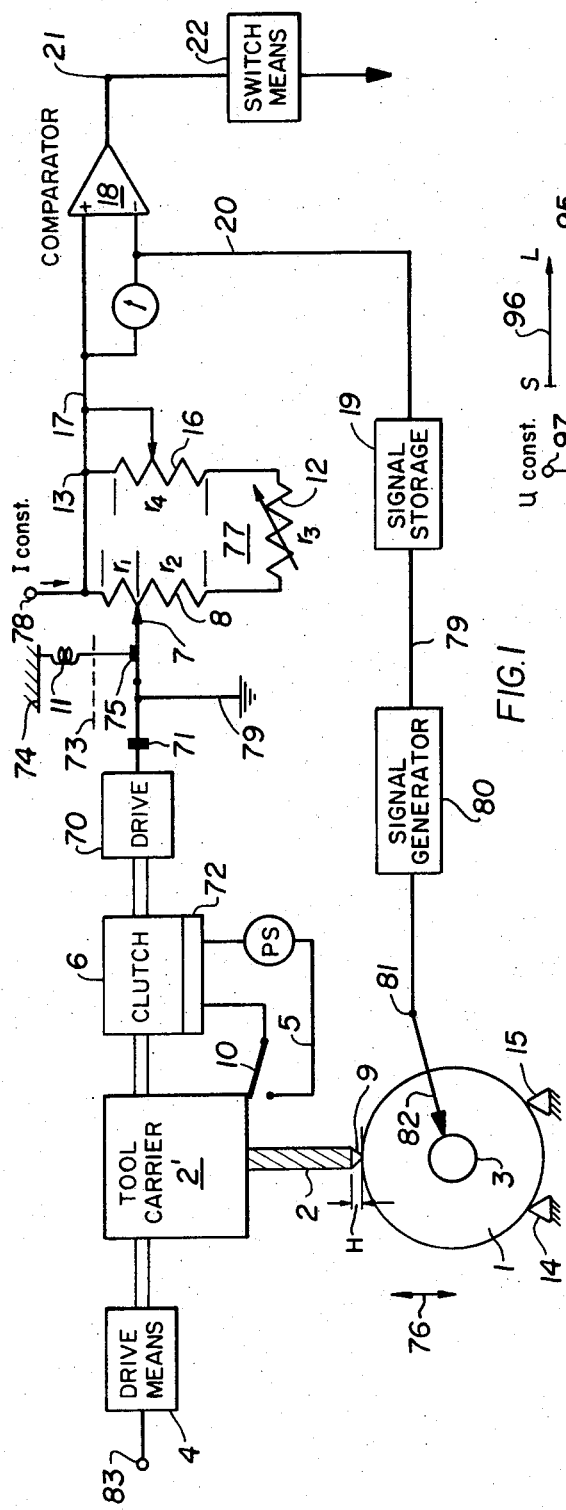
FIG. 1 illustrates an apparatus according to the invention comprising one embodiment of a compensating circuit arrangement wherein closure of a switch in response to the contact between the compensating tool and the body to be balanced and thus the beginning of the balancing operation initiates the production of a control signal.

FIG. 1 illustrates in a schematic manner the balancing of a rotational body 1 having an imbalance. The balancing is accomplished by removing material from the body 1 by means of a drill bit 2 having a conical tip 9 pointing radially toward the rotational axis 3 of said body 1 to remove the material in such radial direction. The body 1 is supported in a stationary position by support members 14 and 15.

The drill bit 2 is held in a tool carrier 2' mechanically driven by drive means 4 such as tool feed advance means comprising, for example, a motor and a gear drive. The drive means 4 are also drivingly connected through a shiftable clutch 6 to a tap 7 of a potentiometer 8. The connection between the clutch 6 and the tap 7 comprises a drive 70 for converting the rotational movement into linear movement to slide the tap 7 along the entire length of the potentiometer 8. The tap 7 is insulated from the drive 70 by an insulator 71.

The clutch 6 is activated by a power source PS in an auxiliary circuit 5 which is closed by a switch 10 when the tip 9 of the drill bit 2 contacts the surface of the body 1. Means such as trip dogs for closing a switch in response to the feed advance of a tool and in accordance with a predetermined tool position are well known in the art. The switch 10 thus assures a coincidence between the beginning of the balancing operation when the drill bit 2 contacts the body 1 and the adjusting movement of the tap 7. The clutch 6 may, for example, be operated by a magnet 72 and when the clutch is actuated the tap 7 will advance along the potentiometer 8 in accordance with the linear advance of the drill bit 2 radially relative to such rotational axis 3 and starting from its zero position indicated by the dashed line 73. Such adjustment is proceeding steadily until the desired balancing has been accomplished as will be described in further detail below. The adjustment 7 proceeds against the force of a tensile spring 11 which is connected between a frame member 74 of the machine and an insulator 75 the latter connecting the tap 7 to the spring 11 which restores the tap to its zero position at the completion of the balancing operation.

As mentioned above, the material removal by the drill bit 2 has a non-linear effect on the balancing which decreases from the periphery of the body 1 toward its rotational axis 3. In addition to this just mentioned non-linear effect there is a non-linearity introduced due to the fact that the tip 9 of the drill bit 2 has a conical shape rather than a cylindrical shape. This additional non-linearity is due to the fact that the conical shape of the tip 9 causes a non-linear material removal even though the drill bit 2 is being advanced in a linear fashion. Such non-linear material removal continues until the entire length or hight H of the tip 9 has advanced into the body 1. The invention teaches to compensate even for this additional non-linearity by providing a slight time lag between the begin of the material removal and the begin of the adjustment of the potentiometer tap 7. This is accomplished by closing the switch 10 at a point of time when the tip 9 has advanced into the body 1 for two-thirds of its hight H. Thus, the drill bit 2 is treated as if it were completely cylindrical because the just mentioned lead of two-thirds H takes into account the fact that the amount of material removed by the tip 9 could be removed by an equivalent completely cylindrical drill bit tip having a hight corresponding to one-third of the hight H of the tip 9. Means for permitting the closing of the switch 10 to trail slightly behind the contact between the tip 9 and the body 1 are well known in the art.

The potentiometer 8 has such a length that the tap 7 may follow the movement of the drill bit 2 until it reaches the rotational axis 3 of the body 1. However, if it is not necessary to drill down to the axis of the rotational body, then it is possible to use a potentiometer 8 which is correspondingly shorter. The distance between the bottom of the drilled hole and the center of the rotational axis may then be represented by a variable resistance 12.

Where the rotational body 1 is supported as shown in FIG. 1 at its periphery in said support members 14 and 15 it will be noted that the rotational axis 3 or rather its center will be located in different levels depending on the different diameters of the rotational body. Stated differently, depending on the size or the diameter of the rotational body its rotational axis will move up and down as indicated by the double arrow 76 provided the support members 14 and 15 retain their fixed positions. Such changes in the position of the rotational axis 3 relative to the drill bit 2 would result in an error in the characteristic curve of the compensating mass which is being removed in the balancing process. According to the invention such errors can be simply eliminated by correspondingly adjusting the resistance 12. In a further embodiment of the invention there is provided an additional adjustable resistor or potentiometer 16 which is simply adjusted with reference to the position of the rotational axis 3 relative to the fixed support members 14 and 15.

The above mentioned potentiometer 8, the variable resistor 12, and the further resistor 16 form according to the invention a two terminal parallel circuit 77 having an input terminal 78 to which is supplied a constant current Iconst. The second terminal is represented by the tap 7 which is electrically connected to ground through a conductor 79. The two terminal parallel circuit comprises two branches. One branch is formed by the portion r1 of the potentiometer 8 whereas the other branch is formed by a series connection of the variable resistor 12 and the potentiometer 16 as well as the second portion r2 of the potentiometer 8. It has been found to be preferable to select the resistance values of said resistors in the two terminal parallel circuit so that r3 which is the resistance of the resistor 12 corresponds to the sum of the resistances r1 and r2. The variable resistor 16 has a resistance r4 which will be determined by the diameter of the rotational body 1 or by the elevational position of the rotational axis 3 relative to the fixed support members 14 and 15.

Since a constant current flows through the two terminal parallel circuit and since the tap 17 is being adjusted in response to the feed advance of the drill bit 2, a voltage drop will be produced at the output 13 of the two terminal parallel circuit which is always directly proportional to the instantaneous mass effect of the mass particles which are being removed by the drill bit 2 and thus directly proportional to the imbalance effect. This voltage drop at the output 13 furnishes a first electrical signal which will be evaluated along with a second electrical signal stored in a signal storage or memory 19. The first electrical signal or voltage drop appearing at the output 13 of the two terminal parallel circuit is supplied through the conductor 17 to one input of a comparator 18 which functions as an operational amplifier. Another input of the operational amplifier or comparator 18 is connected by a conductor 20 to said storage 19.

The input of the storage 19 is connected through a conductor 79 to a signal generator 80 which in turn is connected with its input 81 to a probe 82 for producing a second electrical signal which is proportional to the imbalance of the rotational body 1. Probes and signal generators for producing such an imbalance proportional signal are known in the art, for example, from German Patent 1,108,475. Therefore, it is not necessary to further describe the details of the probe 82 and the signal generator 80 except that the probe 82 could, for example, be a moving coil which moves in response to the imbalance of the rotational body whereby it transforms the mechanical oscillations of the rotating body into respective electrical oscillations which are then amplified in the signal generator 80 which is a generator in the sense that the probe 82 is a part of the circuitry which produces the imbalance representing signal.

The comparator circuit 18 compares the imbalance proportional signal with the signal which is proportional to the instantaneous balancing effect and produces at its output 21 a control signal which is supplied to switch means 22, for example, in the form of relay means which would be operative to stop the drive means 4, for example, by supplying a respective control signal to the input 83 of the drive means 4. Preferably or advantageously the switch means 22 comprise a threshold responsive switch which is connected to the input of the drive means 4 of the tool carrier 2' whereby the threshold responsive switch will cause the termination of the balancing operation and simultaneously the reverse feed of the tool carrier 2' when the two signals fed to the input of the comparator 18 are equal to each other. As long as the two signals are not equal to each other in response to the instantaneous balancing status, the desired balancing has not yet been achieved and the tool will continue to work until such desired balance has been achieved.

An indicating instrument 23 may be connected across the inputs of the comparator 18 whereby the steady balancing or compensation process which is proportional to the effect of the imbalance may be indicated so that a manual control is also possible.

Figure 2A:
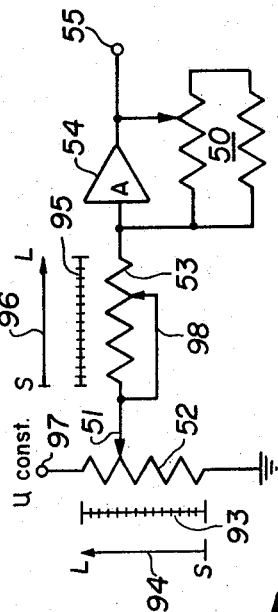
FIG. 2a illustrates an embodiment wherein the opening of a contact at the beginning of the balancing operation of the tool initiates the production of a control signal.

Referring to FIG. 2a there is shown an embodiment wherein the evaluating function of the two signals is started by the opening of a switch 30 which is opened rather than closed in response to the beginning of the balancing operation. This may be accomplished by a trip dog 90 positioned to be operable for opening the switch 30 which is insulated from the trip dog by an insulator 30'

The two terminal parallel circuit 87 of FIG. 2a corresponds substantially to the two terminal parallel circuit 77 of FIG. 1. However, only one potentiometer 32 and one variable resistor 33 are connected in parallel to each other.

The tap 31 of the potentiometer 32 is connected through an insulator 85 to an operating member 84 for shifting the tap 31 along the length of the potentiometer 32. Further, the tap is connected to ground through a conductor 86.

A negative constant current −Iconst. is supplied to the input 89 of the two terminal parallel circuit 87 when the circuit arrangement is used in connection with a balancing operation involving material removal. However, for using the circuit in connection with balancing by material addition the constant current will be a positive current +Iconst.

A further input 37 is provided for supplying to the circuit arrangement a second signal which will be positive when material removal is involved but negative when material addition is involved.

In connection with the drive member 84 for the potentiometer tap 31 it should be noted that no shiftable coupling is required so that the drive member 84 can be directly coupled or connected to the drive means such as shown at 4 in FIG. 1 which drive the tool effecting the balancing operation.

The first signal which is proportional to the balancing effect is provided at the output 34 of the two terminal parallel circuit 87. The output 34 is connected through a conductor 35 and through series connected capacitors 36 and 43 to the input 91 of an operational amplifier 42. The above mentioned switch 30 is connected between the junction of the two capacitors 36 and 43 and ground.

The above mentioned second signal U or −U which is supplied to the input 37 is fed through a resistor 39 and switch 38 to a capacitor 41 which is connected in parallel to the operational amplifier 42 between its input terminal 91 and its output terminal 44 to which is also connected an indicating instrument 45 and switch means 46 which correspond in their function to the switch means 22 of FIG. 1. A resistor 40 is connected in parallel to the series connection of said switch 38 and said capacitor 41. The signal U or −U is proportional to the imbalance and could be produced, for example, as has been described with reference to FIG. 1 and the probe 82 as well as the signal generator 80.

The resistances 39 and 40 are calculating resistances and the parallel connection of the capacitor 41 with the operational amplifier 42 forms a storage unit for the imbalance proportional signal U or −U which remains stored subsequent to the opening of the switch 38.

As long as the compensating tool has not yet come into contact with the rotational body 1, the junction 56 between the capacitors 36 and 43 remains grounded through the switch 30. As a result, no charge is being withdrawn from the storage capacitor 41 even though the tap 31 of the potentiometer 32 is moved along by the feed advance of the compensating tool. Such charge withdrawal begins only when the tool comes into contact with the peripheral surface of the rotational body 1. Thus it is a special advantage of the embodiment of FIG. 2 that the zero position of the tap 31 may be located at different places along the potentiometer 32. Thus, drill bits of different length may be used interchangeably. Because the production of a control signal will always start only when the tool contacts the workpiece.

Figure 2B:
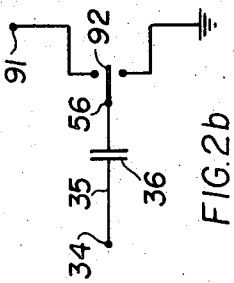

The production of a control signal in the circuit arrangement of FIGS. 2a and 2b begins when the tool contacts the workpiece whereby the switch 30 is opened. As a result, the removal of charge from the capacitor 41 is controlled in response to the signal supplied at the output 34 and thus in response to the balancing operation because the signal appearing at the output 34 is proportional to the balancing effect. Stated differently, the capacitor 41 is discharged in response to the instantaneous radial movement of the compensating tool and to an extent which is itendical to the imbalance effect.

The capacities of the capacitors 36 and 43 is preferably or suitably selected so that each of these capacities is twice as large as the capacity of the storage capacitor 41.

At the output 44 of the operational amplifier 42 the indicating instrument 45 may be used in the same manner, that is for a manual control as has been described with reference to the instrument 23 shown in FIG. 1. Similar considerations apply to the switch means 46 of which correspond to the switch means 22 and may be threshold responsive switch means.

Referring to FIG. 2b it will be noted that instead of using the single pole single throw switch 30 and the capacitor 43 it is possible to use but one single pole double throw switch 92 which connects the junction 56 either with ground or with the input 91 of the operational amplifier 42.

It is also an advantage of the embodiment of FIG. 2 that the tool advance toward the workpiece does not alter or vary the charge stored in the capacitor 41 and that the controlled discharge starts only when the tool touches the workpiece.

Incidentally, the storage 19 of FIG. 1 could be embodied in the same manner as has been described in connection with the capacitor 41 and the operational amplifier 42 shown in FIG. 2a.

As mentioned, the circuit arrangement according the FIG. 2 is equally useful for a balancing operation involving material removal or a balancing operation involving material addition. In the latter instant the polarities of the signals are merely reversed and the mentioned advantages apply in both instances.

Especially in connection with the balancing of crank shafts the invention has made it possible for the first time to drill without any errors holes into the counter weights of such crank shafts having different radii and without the need for calculating additional approximation curves. Such drilling may be accomplished even where it is necessary to drill into raugh drilled holes. These advantages have been made possible because the operational switch 30 places the circuit arrangement into operation only when the switch is opened at the time of contact between the tip 9 of the drill bit with the rotational body 1.

Figure 3:
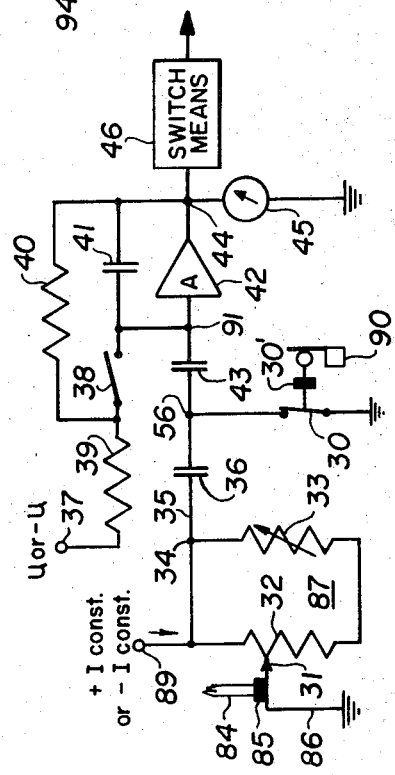
FIG. 3 illustrates a circuit arrangement for modifying or adjusting a constant current supplied to the networks according to FIGS. 1 or 2a or 2b.

The circuit arrangement according to FIG. 3 serves for influencing or controlling the first signal which is produced at the output 13 or at the output 34 of the two terminal parallel circuits as shown in FIGS. 1 or 2. Such influencing is accomplished in response to the diameter of the tool and/or in response to the density of the compensating mass. Different or additional parameters may also be used.

The constant current which is supplied in FIG. 1 to the two terminal parallel circuit 77 or in FIG. 2 to the two terminal parallel circuit 87 is varied in its value by means of a potentiometer 52 the tap 51 of which is manually adjustable, for example, in accordance with the diameter of the tool selected. The potentiometer 52 is supplied by a constant voltage at its input 97. The tap 51 is manually adjustable with reference to a dial 93 which, as mentioned, may be calibrated in accordance with the diameters of tools to be used. Thus, the arrow 94 points out how the calibration may start with small diameter values S in order to increase to large diameter values L.

A further potentiometer 53 is connected in series between the tap 51 and an input of an operational amplifier 54. The tap 98 of the potentiometer 53 is also manually adjustable with reference to a calibrated dial 95 which, for example, may be calibrated in accordance with the density of the compensating mass. Thus, the arrow 96 indicates how the dial may start with small density values S in order to increase toward large density values L.

As seen in FIG. 3 the two terminal parallel circuit 50, which corresponds to circuit 77 in FIG. 1 or to circuit 87 in FIG. 2a, is connected in negative feed back fashion to the operational amplifier 54 whereby a voltage is produced at the output 55 of the operational amplifier 54 which is equal to the product of the input current and the resistance of the two terminal parallel circuit 50 connected in negative feed back fashion. The output 55 of the operational amplifier 54 corresponds to the output 13 or 34 of the two terminal parallel circuits of FIGS. 1 and 2.

Although the invention has been described with reference to specific examples, it is to be understood that it is intended to cover all modifications and equivalents within the scope of the appended claims. Especially, the invention is not limited to a balancing operation in which mass is being removed by a machining operation, for example, drilling, milling, and turning or by means of electrons or energy beams. The invention is also applicable without limitations for the control of balancing machines which accomplish the balancing by means of material addition in the radial direction, for example, by means of welding, soldering or other controlled material addition.

What we claim is:

1. An apparatus for controlling a machine for balancing a rotational body having a rotational axis and an imbalance relative to said axis, comprising tool means for correcting said imbalance by changing a compensating mass which mass change causes a non-linear variation of the effect of said compensating mass radially relative to said rotational axis, first means operatively connected to said tool means for producing a first electrical signal proportional to said non!-linear variation, second means operatively associated with said machine for producing a second electrical signal proportional to said imbalance, storage means connected to said second means for storing said second electrical signal, threshold signal producing means connected to said storage means and to said first means for evaluating the first electrical signal and the stored second electrical signal to produce a threshold control signal, control means connected to said threshold signal producing means and to said tool means for stopping said tool means in response to said threshold control signal, wherein said first means for producing said first electrical signal comprise a constant current source, a two terminal parallel circuit having a first and a second branch connected between said source and ground, said two terminal parallel circuit comprising a potentiometer having a given total resistance value and a tap operatively connected to said tool means, said first branch of said two terminal parallel circuit comprising a resistance corresponding in value to one resistance portion of said potentiometer in accordance with the instantaneous position of said tap, the second branch of said two terminal parallel circuit comprising a series connection of a variable resistance corresponding in its value to said given resistance and a further resistance corresponding to the other portion of said potentiometer, and means for connecting said two terminal parallel circuit to said threshold signal producing means.

2. The apparatus according to claim 1, wherein said threshold signal producing means comprise a comparing circuit network having one input connected to said first means and another input connected to said storage means.

3. The apparatus according to claim 2, further comprising an indicating instrument connected across the inputs of said comparing circuit.

4. The apparatus according to claim 1, wherein said potentiometer has a length corresponding to the length between said rotational axis and the beginning of the tool advance radially toward said rotational axis.

5. The apparatus according to claim 1, wherein said storage means comprise a storage capacitor, said evaluating means comprising an operational amplifier connected in parallel to said storage capacitor and having an input and an output, means for connecting the input to said second means for charging the storage capacitor in response to said second electrical signal, said apparatus comprising further capacitor means connected to said two terminal parallel circuit, and switching means connected for effectively interposing said further capacitor means between said input and said two terminal parallel circuit, whereby said storage capacitor is discharged in response to the instantaneous value of the first electrical signal which is produced by said two terminal parallel circuit, said discharge continuing until said operational amplifier produces said threshold signal.

6. The apparatus according to claim 5, wherein said switching means comprise a switch, and means for mechanically connecting said switch to said tool means for opening said switch in response to the tool means contacting said rotational body.

7. The apparatus according to claim 6, wherein said further capacitor means comprise two capacitors, connected in series between said input and said two terminal parallel circuit, said switch being connected between the two series connected capacitors and ground.

8. The apparatus according to claim 5, wherein said switching means comprise a single pole double throw switch for selectively connecting said further capacitor means to ground and to said input.

9. The apparatus according to claim 1, further comprising drive means for said tool means, a clutch between said potentiometer tap and said drive means, and means for actuating said clutch in response to the tool means contacting said rotational body.

10. The apparatus according to claim 1, wherein said constant current source comprises a constant voltage source and further potentiometer means connected between said constant voltage source and said two terminal parallel circuit for modifying a constant current supplied by said source, an operational amplifier having an input and an output and connected in parallel to said first branch of said two terminal parallel circuit, whereby said two terminal parallel circuit is connected for negative feedback from said output to said input of the operational amplifier, said potentiometer tap being connected to the output of the operational amplifier for providing said first electrical signal.

11. The apparatus according to claim 10, wherein said tool means comprise a drill bit, said further potentiometer means comprising a potentiometer with a scale calibrated with reference to the diameter of different drill bits, said potentiometer being manually adjustable relative to such scale for modifying said constant current in accordance with the drill bit diameter.

12. The apparatus according to claim 10, wherein said further potentiometer means comprise a potentiometer with a scale calibrated with reference to the density of said rotational body, whereby said potentiometer is manually adjustable relative to such scale for modifying said constant current in accordance with said density.

13. The apparatus according to claim 10, wherein said potentiometer means comprise a first potentiometer connected between said constant voltage source and ground, and a second potentiometer, tap means in said first potentiometer connected to said second potentiometer which is in turn connected to said operational amplifier, whereby said second potentiometer is connected in series between said tap of the first potentiometer and the input of said operational amplifier.

14. The apparatus according to claim 1, wherein said two terminal parallel circuit comprises a further potentiometer in said second branch.

15. The apparatus according to claim 1, wherein said two terminal parallel circuit comprises a further potentiometer and a variable resistor in said second branch.

16. The apparatus according to claim 5, wherein said storage capacitor has a given capacity and said further capacitor means comprise two capacitors each having a capacity corresponding to twice the given capacity.

17. The apparatus according to claim 5, wherein said further capacitor means comprises two capacitors connected in series between said inputs, said switching means comprising a single pole single throw switch connected between the junction of said two series connected capacitors and ground, whereby said discharging of said storage capacitor is initiated by opening said switch.

18. The apparatus according to claim 5, wherein said further capacitor means comprises one capacitor, said switching means comprising a single pole double throw switch connected with its pole to said one capacitor and with its throw arms selectively between ground and said input of the operational amplifier.

* * * * *